July 17, 1928.
M. E. LANGE ET AL
1,677,143
MULTIPLE TOOL HOLDER FOR CROSS SLIDES OF LATHES
Filed July 14, 1926 2 Sheets-Sheet 1
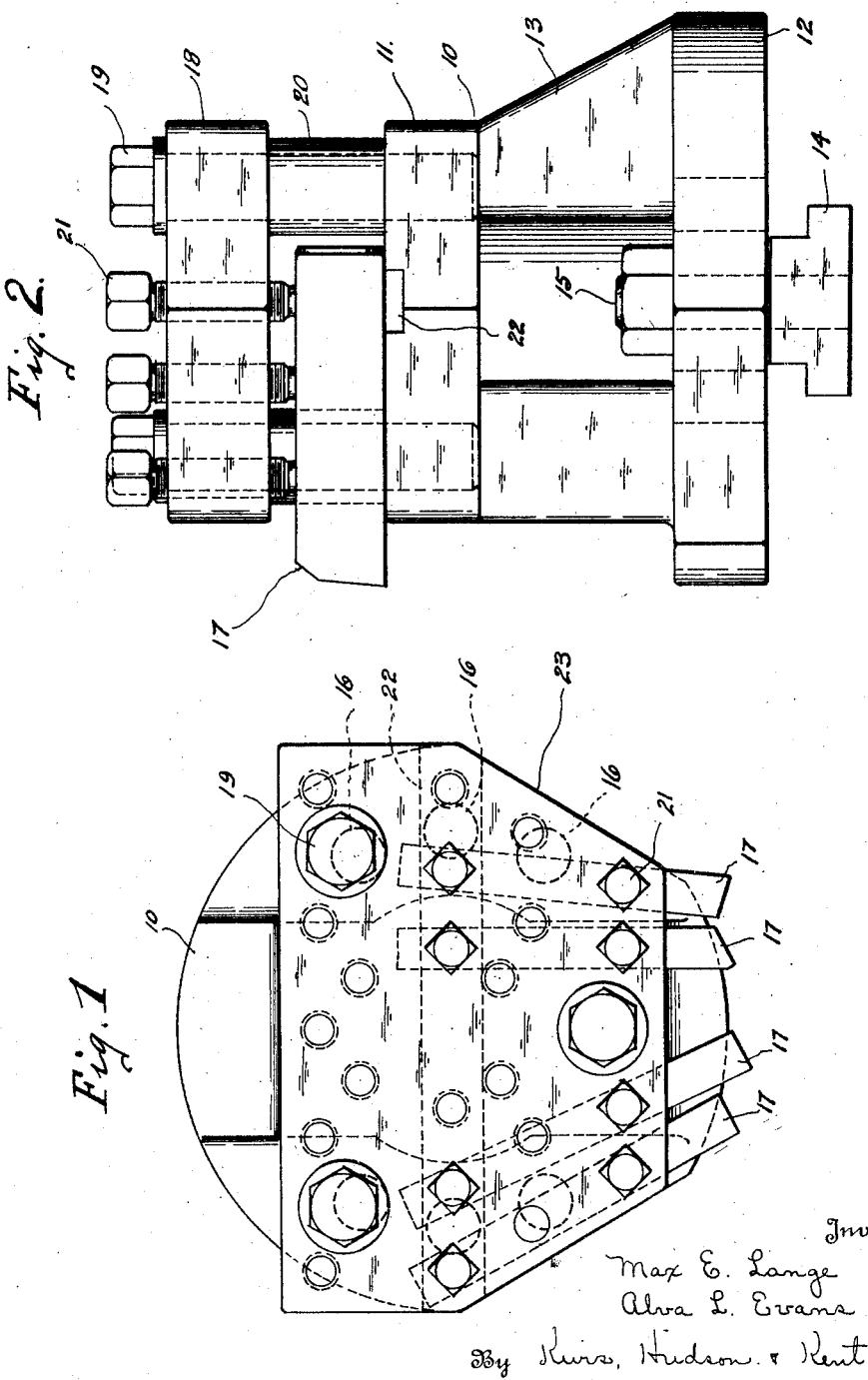

July 17, 1928.
M. E. LANGE ET AL
1,677,143
MULTIPLE TOOL HOLDER FOR CROSS SLIDES OF LATHES
Filed July 14, 1926   2 Sheets-Sheet 2
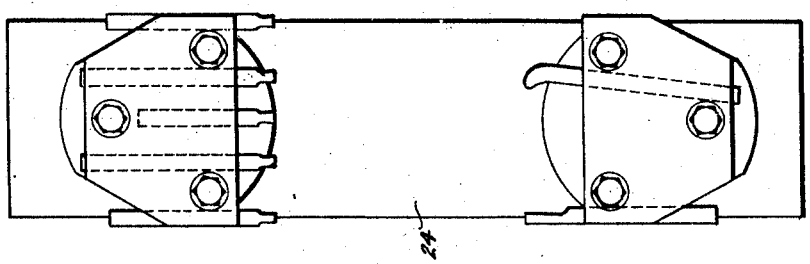
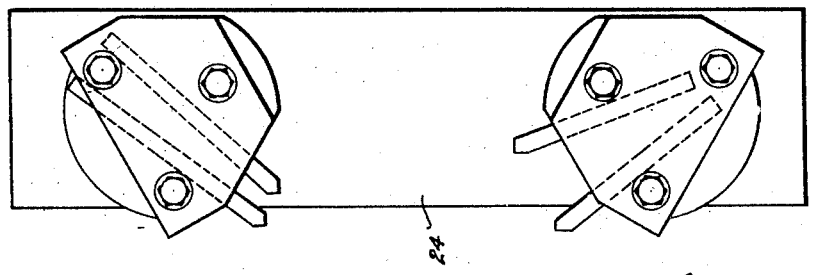
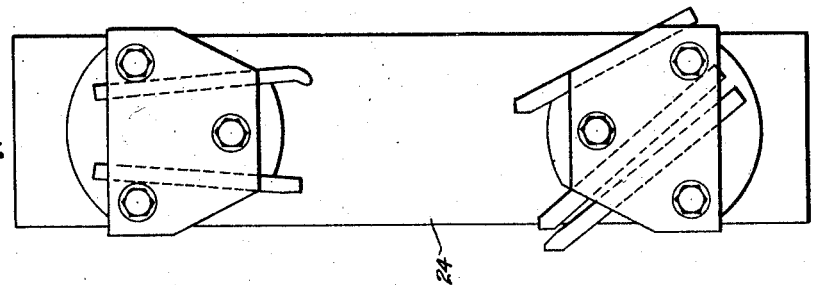
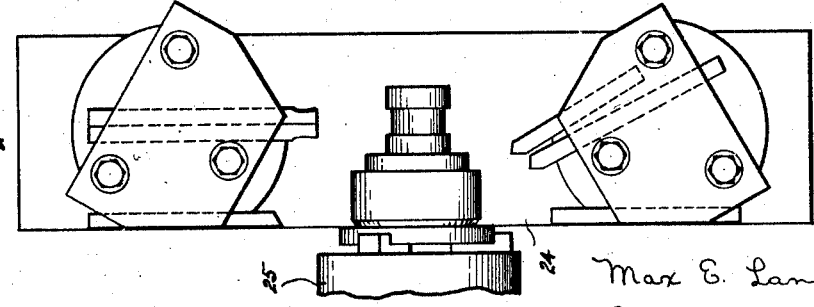
Max E. Lange
Alva L. Evans
Inventors
By Kurs, Hudson & Kent.
Attorneys Patented July 17, 1928.

1,677,143

UNITED STATES PATENT OFFICE.

MAX E. LANGE AND ALVA L. EVANS, OF EAST CLEVELAND, OHIO, ASSIGNORS TO THE WARNER AND SWASEY COMPANY, OF CLEVELAND, OHIO, A CORPORATION OF OHIO.

MULTIPLE TOOL HOLDER FOR CROSS SLIDES OF LATHES.

Application filed July 14, 1926. Serial No. 122,327.

This invention relates to an improved cutter holder for machine tools and particularly for lathes such as engine lathes, turret lathes and the like, the present cutter holder being designed particularly for application to the cross-slide of such lathes.

The principal object of the invention is to provide a tool holder adapted to be supported in a plurality of different predetermined positions on the cross-slide and having provision for holding one or a plurality of tools in a plurality of different predetermined positions, with the body of the holder so formed as to cause the least possible interference with the adjacent parts of the lathe such as the work holding chuck or tools carried by the turret, if the lathe has a turret.

A further object is to provide a holder of this kind so formed that the holder can be positioned close to the work so that the tools will have the least possible over-hang and will therefore be well supported in the holder.

The invention may be briefly summarized as consisting in certain novel details of construction and combinations and arrangements of parts which will be described in the specification and set forth in the appended claims.

In the accompanying sheets of drawings wherein we have shown the preferred embodiment of our invention, Fig. 1 is a top plan view of the cutter holder; Fig. 2 is a side elevation of the same; Figs. 3, 4, 5 and 6 are more or less diagrammatic views illustrating conventionally the cross-slide and showing the holder in various positions and the tools arranged in different combinations and supported in a plurality of different positions so as to illustrate how the objects stated above are attained by the construction, the cross-slide being in each of these figures provided with duplicate holders one at the front and the other at the rear of the cross-slide.

Referring now to the drawings, the tool holder comprises a base portion 10 which is generally in the form of a casting, this base portion having an upper part 11 on which the tools are adapted to be supported and a lower part 12 joined to the upper part by ribs 13, the part 12 being adapted to rest on the cross-slide of the lathe. The holder is adapted to be secured to the cross-slide by a T-block 14 and two bolts 15, these bolts being adapted to be extended through two oppositely disposed openings, a number of pairs of which are arranged in arcuate or circular arrangement with respect to the center of the holder, these openings which are designed by the reference character 16 and which are shown by dotted lines in Fig. 1 being so positioned that the holder can be supported in six different predetermined positions on the cross slide, as illustrated in Figs. 3 to 6.

As previously stated, a plurality of tools are adapted to be supported by the holder, these tools being designated 17. The type or form of the tool will depend, of course, upon the character of the cutting operation to be performed, these tools being generally adapted for turning, facing, necking, chamfering or forming purposes. The tools are clamped between the top portion 11 of the base 10 and a top plate 18 which is secured in fixed position by three bolts 19 and spacing bushings 20, these bolts passing through the top plate 18 and having threaded engagement with the top portion 11 of the base.

The tools are held in position by a number of set screws 21, two or more of which are employed for holding each tool in place. The set screws pass through threaded openings in the top plate 18, a large number of which openings are provided and arranged so as to permit the tools to occupy certain definite positions in any one of the several predetermined positions in which the holder itself may be mounted on the cross-slide.

The top portion 11 of the base is further provided with a groove 22 shown by full lines in Fig. 2 and by dotted lines in Fig. 1, which groove is adapted to receive a boring bar which is designed to be held in position in the groove in the same manner that the tools 17 are secured in place, the top plate 18 being provided with a number of openings directly above the groove 22 so that a series of these set screws can be employed to hold the boring bar in place so that it may be supported in the holder precisely at right angles to the movement of the cross-slide on the cross-slide carriage and, therefore, parallel to the axis of the machine.

It will be noted that the tool holder body has two corner portions removed, and that the upper portion of the body including the plate 18 and top portion 11 of the base is hexagonal in form, being provided with six straight sides which are adapted to be definitely positioned with respect to the other parts of the lathe, such as the work-holding chuck and turret, the object of the cut-away portions which are indicated at 23 being to provide maximum clearance or to minimize interference with the tools which may be held in the turret allowing the chuck, tool holder and turret at times to be brought close together.

In brief, it may be stated that the holder has a series of openings for securing it to the cross-slide whereby the holder may be placed in a plurality of different predetermined positions, also that the holder is provided with means whereby one or a plurality of different tools may be supported in a plurality of predetermined positions with respect to the holder, whereby they have almost an infinite number of positions with respect to the work, having in mind the fact that the holder itself can be placed in several definite positions on the cross-slide, and that the holder additionally has portions cut away to afford clearance and its top portion has a hexagonal shape all sides of which may be definitely positioned or have a predetermined relation with respect to the work piece as well as the other parts of the machine tool including the chuck turret and tools carried by it, and also definitely related to the different positions in which the tools may be placed in the holder.

In Figs. 3 to 6 we have indicated the cross-slide at 24, different views of the same being given to illustrate the universality of the holder and of its tools and to bring out the clearance providing function of the cut-away portions of the holder when it is secured in any of its several definite positions. Furthermore, in these figures we have illustrated two of our improved holders on the cross-slide for in practice it is customary to employ two holders on the cross-slide, each having its properly functioning tools adapted to engage the work piece. In each figure the two holders are similarly positioned on the cross-slide but this is not a necessary condition to the conjoint use of two holders.

It is not necessary to discuss the effect or advantages of the holder in all the different positions shown in Figs. 3 to 6 as the advantages will be apparent from the consideration of the figures themselves. We might say that adjacent to Fig. 3 we have indicated the chuck at 25 in its relation to the cross-slide, the particular positions of the holders in this figure illustrating the value of the cut-away portions of the holders in permitting close proximity to the chuck.

Having thus described our invention, we claim:

1. A tool holder for the cross-slide of a lathe having a lower portion adapted to be secured to the cross-slide in a plurality of different positions including positions which are complete reversals of others and having an upper tool receiving portion with provision for clamping one or a plurality of tools therein in any one of a number of predetermined positions in definite relation to the different positions of the holder on the cross-slide, said holder being polygonal-shaped with provision for supporting tools so that they may project from any face thereof, and being provided with corners cut away on lines having definite relation to the adjacent parts of the lathe in the different positions in which the holder may be placed on the cross-slide forming faces of different lengths.

2. A polygonal-shaped tool holder for the cross-slide of a lathe, comprising a lower portion having a plurality of pairs of openings, holder-securing bolts adapted to be extended through different pairs of such openings, the latter being so arranged that the holder can be secured to the cross-slide in a plurality of different predetermined positions including positions which are complete reversals of others, and said holder having an upper portion consisting of spaced top and bottom members between which one or a plurality of tools may be placed and the top member having a plurality of openings with set screws adapted to be extended therethrough to secure the tools in place, which openings have a predetermined relation so that a tool can be presented to the work in predetermined ways for each of the different positions in which the holder may be secured to the cross-slide and so that the tools may project from any of the different faces of the holder, and the holder being further provided with cut-away corner portions forming sides which have predetermined relation to the other parts of the lathe when the holder is secured in its different positions whereby likelihood of interference with said parts is reduced and forming an irregular polygon.

In testimony whereof, we hereunto affix our signatures.

MAX E. LANGE.
ALVA L. EVANS.